United States Patent
Himmelmann

(10) Patent No.: US 10,233,931 B2
(45) Date of Patent: Mar. 19, 2019

(54) TURBINE PUMP ASSEMBLY WITH VACUUM PURGED CENTRIFUGAL IMPELLER SHROUDS

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 486 days.

(21) Appl. No.: 14/997,905

(22) Filed: Jan. 18, 2016

(65) Prior Publication Data
US 2017/0204863 A1 Jul. 20, 2017

(51) Int. Cl.
F04D 13/04 (2006.01)
F04D 29/22 (2006.01)
F04D 15/00 (2006.01)
B64G 1/24 (2006.01)

(52) U.S. Cl.
CPC ............. *F04D 13/043* (2013.01); *B64G 1/24* (2013.01); *F04D 15/0005* (2013.01); *F04D 29/22* (2013.01)

(58) Field of Classification Search
CPC .................. F05D 2260/602; F05D 2260/6022
USPC ............................................ 415/168.1, 168.2
See application file for complete search history.

(56) References Cited

U.S. PATENT DOCUMENTS

| 705,347 A | * | 7/1902 | Harris | 415/168.2 |
| 913,407 A | * | 2/1909 | Ljungstrom | 415/168.2 |
| 3,728,857 A | * | 4/1973 | Nichols | F01D 11/04 184/6.11 |

* cited by examiner

Primary Examiner — Jason D Shanske
Assistant Examiner — Brian O Peters
(74) Attorney, Agent, or Firm — Cantor Colburn LLP

(57) ABSTRACT

Turbine pump assemblies and methods of making the same are provided. The assemblies include a body, a centrifugal pump having a shroud located within the body, a shroud cavity formed external to the shroud, and an ejector pump fluidly connected to the shroud cavity by a purge gas flow path, the ejector pump configured to reduce a pressure within the shroud cavity.

13 Claims, 10 Drawing Sheets

TURBINE PUMP ASSEMBLY WITH VACUUM PURGED CENTRIFUGAL IMPELLER SHROUDS

BACKGROUND

The subject matter disclosed herein generally relates to turbine pump assemblies and, more particularly, to turbine pump assemblies having vacuum purged centrifugal impeller shrouds.

Rockets may be used to launch payloads into space, including inserting payloads into various orbits around the earth or other celestial bodies and/or directing payloads through space. Rockets are maneuvered by vectoring a rocket engine thrust direction. In some configurations, a thrust vector control system may be configured to use hydraulic rams to displace an engine nozzle angle relative to a rocket core axis to control a thrust vector to ensure proper propulsion of a rocket. Hydraulic rams require high pressure hydraulic fluid pumping systems capable of providing, for example, up to 4000 psia at flow rates of 40-100 gallons per minute or greater.

In some systems, the hydraulic flow and pressure may be generated by a turbine pump assembly. The turbine pump assemblies may be powered by hot combustion products, or high pressure cold gas provided by a main engine turbo-pump assembly. Some systems may be configured with a turbine shaft, idler shaft, and output shaft, with a turbine rotational speed controlled by a turbine speed control valve. The turbine speed control valve may operate at speeds that are less than the turbine and may be configured to control flow of fluids to the turbine. In some configurations, the turbine speed control valve may be configured as a flyweight governor actuated spool valve.

Typically, a turbine pump assembly turbine may operate most efficiently at very high rpm (e.g., 115,000 rpm). This is in contrast to positive displacement a hydraulic pump which may operate at significantly lower speeds (e.g., 6100 rpm). To accommodate the differences in operating speed between the turbine and the positive displacement hydraulic pump, a gear reduction system may be incorporated between the positive displacement hydraulic pump and the turbine. For example, a gear reduction system may be utilized to reduce the turbine operating speed (115,000 rpm) down to the positive displacement hydraulic pump operating speed (6100 rpm). The gear reduction system must be geared properly and must be robust enough to transfer power to both the positive displacement hydraulic pump and the valve mechanically linked thereto. Such systems may be large, complex, and expensive.

Such conventional methods and systems have generally been considered satisfactory for their intended purposes. However, improved systems and particularly improved turbine pump assembly systems may provide cost, efficiency, weight, and/or other benefits.

SUMMARY

According to one embodiment, a turbine pump assembly is provided. The assembly includes a body, a centrifugal pump having a shroud located within the body, a shroud cavity formed external to the shroud, and an ejector pump fluidly connected to the shroud cavity by a purge gas flow path, the ejector pump configured to reduce a pressure within the shroud cavity.

In addition to one or more of the features described above, or as an alternative, further embodiments of the assembly may include an inner diameter seal and an outer diameter seal, the seals configured to seal the shroud cavity with respect to a liquid fluid path within the turbine pump assembly.

In addition to one or more of the features described above, or as an alternative, further embodiments of the assembly may include that at least one of the inner diameter seal and the outer diameter seal is configured to enable fluid to escape through the respective seal from the shroud cavity.

In addition to one or more of the features described above, or as an alternative, further embodiments of the assembly may include that the ejector pump is formed within a diffuser flow path of the turbine pump assembly.

In addition to one or more of the features described above, or as an alternative, further embodiments of the assembly may include that the ejector pump comprises an ejector pump face formed in a surface of the body defining the diffuser flow path.

In addition to one or more of the features described above, or as an alternative, further embodiments of the assembly may include that the diffuser flow path comprises a diffuser throat and a diffuser cone, wherein the ejector pump is formed at transition from the diffuser throat to the diffuser cone.

In addition to one or more of the features described above, or as an alternative, further embodiments of the assembly may include that the shroud is a first shroud and the shroud cavity is a first shroud cavity, the centrifugal pump having a second shroud and a respective second shroud cavity formed external to the second shroud.

In addition to one or more of the features described above, or as an alternative, further embodiments of the assembly may include that the ejector pump is fluidly connected to the first shroud cavity and the second shroud cavity to reduce a pressure in each of the first shroud cavity and the second shroud cavity.

In addition to one or more of the features described above, or as an alternative, further embodiments of the assembly may include a plug configured to plug a portion of the purge gas flow path.

According to another embodiment, a method of manufacturing a turbine pump assembly is provided. The method includes, forming a body and forming an ejector pump to purge gas through a purge gas flow path within the body to reduce a pressure within a shroud cavity that is external to a centrifugal pump.

In addition to one or more of the features described above, or as an alternative, further embodiments of the method may include installing a centrifugal pump into the body, the centrifugal pump having a shroud, wherein the shroud defines a portion of the shroud cavity.

In addition to one or more of the features described above, or as an alternative, further embodiments of the method may include installing an inner diameter seal and an outer diameter seal about the shroud, the seals configured to seal the shroud cavity with respect to a liquid fluid path within the turbine pump assembly.

In addition to one or more of the features described above, or as an alternative, further embodiments of the method may include that at least one of the inner diameter seal and the outer diameter seal is configured to enable fluid to escape through the respective seal into the shroud cavity.

In addition to one or more of the features described above, or as an alternative, further embodiments of the method may include generating a low pressure at the ejector pump to pull fluid through the purge flow path into a diffuser flow path to expel liquid out of the shroud cavity.

In addition to one or more of the features described above, or as an alternative, further embodiments of the method may include plugging a portion of the purge gas flow path with a plug.

According to another embodiment, a method of operating a turbine pump assembly is provided. The method includes generating a low pressure at an ejector pump, pulling fluid through a purge gas flow path from a shroud cavity, and forming a gaseous lubricant within the shroud cavity by vaporizing a portion of the fluid within the shroud cavity.

In addition to one or more of the features described above, or as an alternative, further embodiments of the method may include that the fluid pulled through the purge gas flow path is supplied into a diffuser fluid path.

In addition to one or more of the features described above, or as an alternative, further embodiments of the method may include that the ejector pump is formed within the diffuser fluid path.

Technical effects of embodiments of the present disclosure include a turbine pump assembly having vacuum purged centrifugal pump impeller shrouds. Further technical effects include providing a vacuum or near vacuum within a shroud cavity of a centrifugal pump within a turbine pump assembly.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
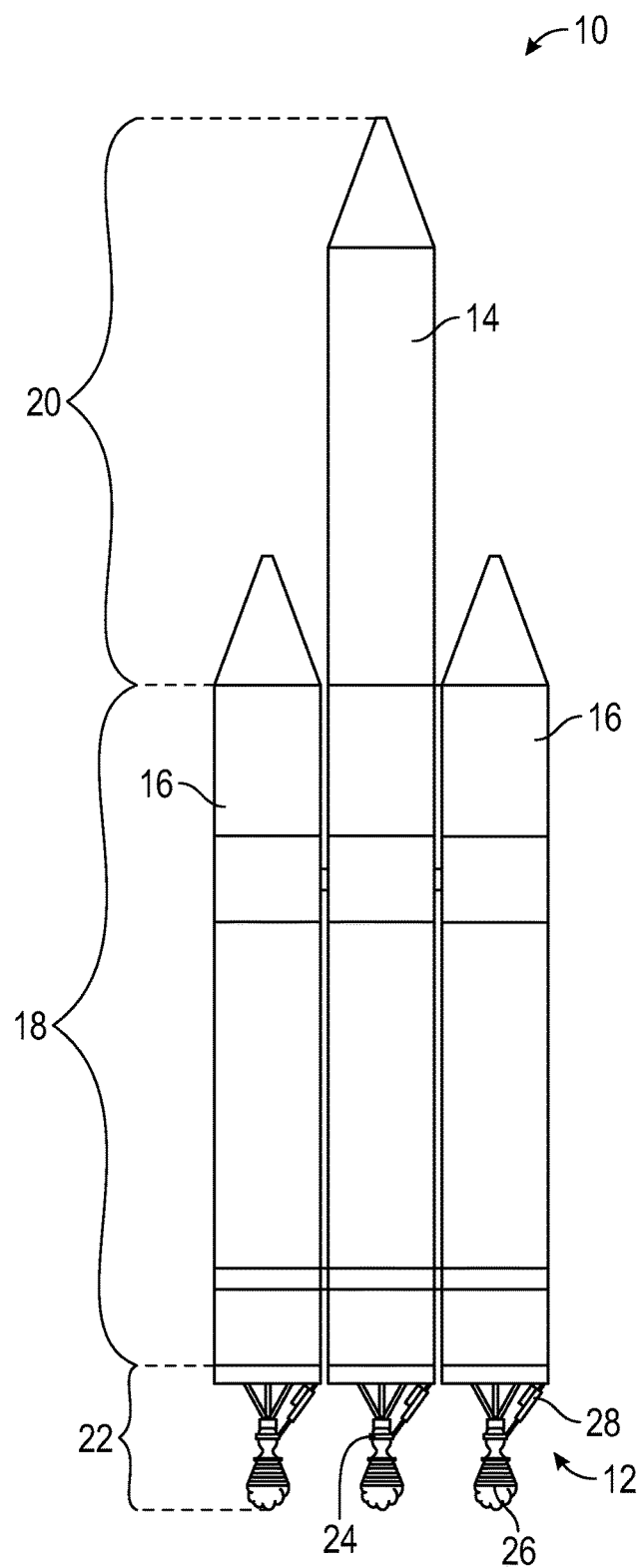
FIG. 1A is a schematic illustration of a craft that may incorporate embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1B:
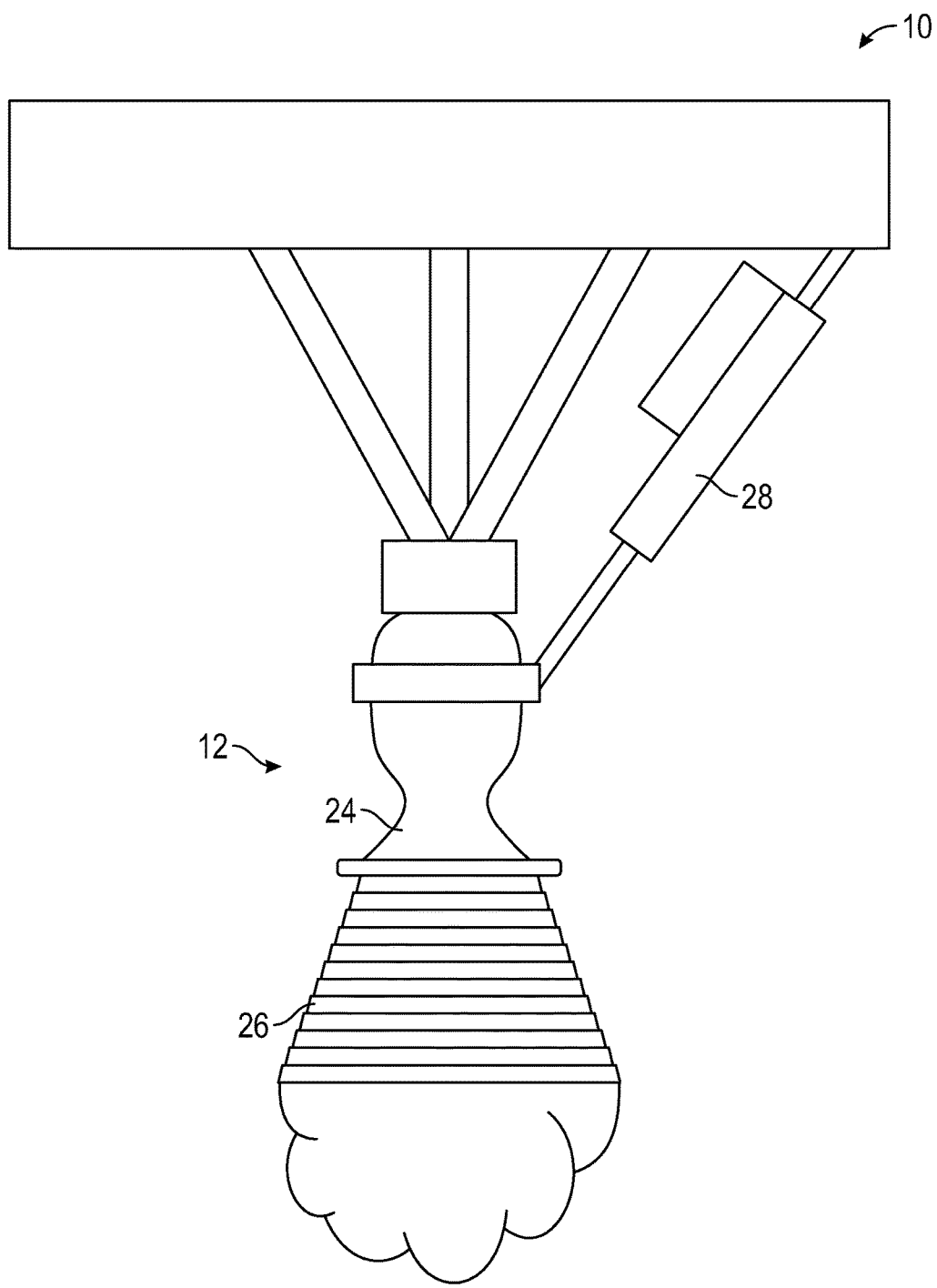
FIG. 1B is an enlarged schematic illustration of a portion of the craft of FIG. 1A.
Figure 1C:
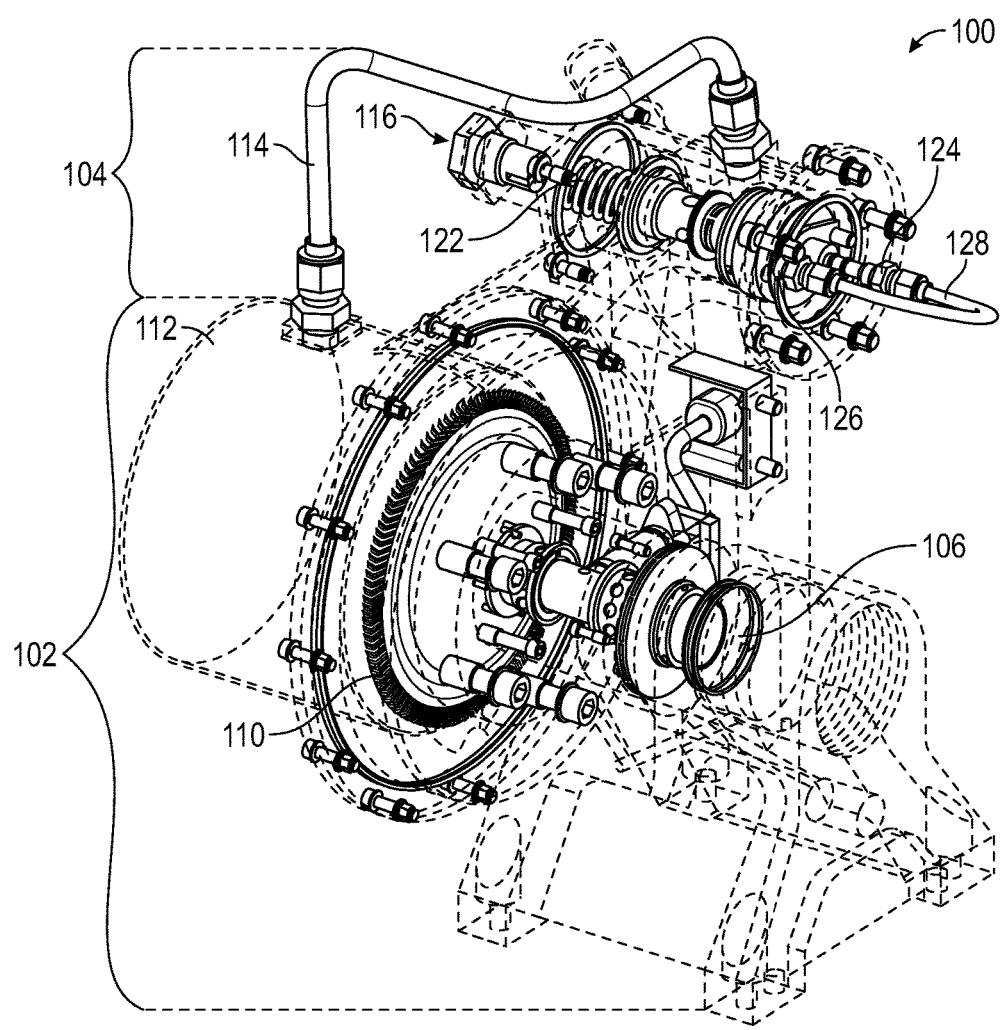
FIG. 1C is a schematic illustration of a turbine pump assembly for a craft as shown in FIG. 1A.
Figure 1D:
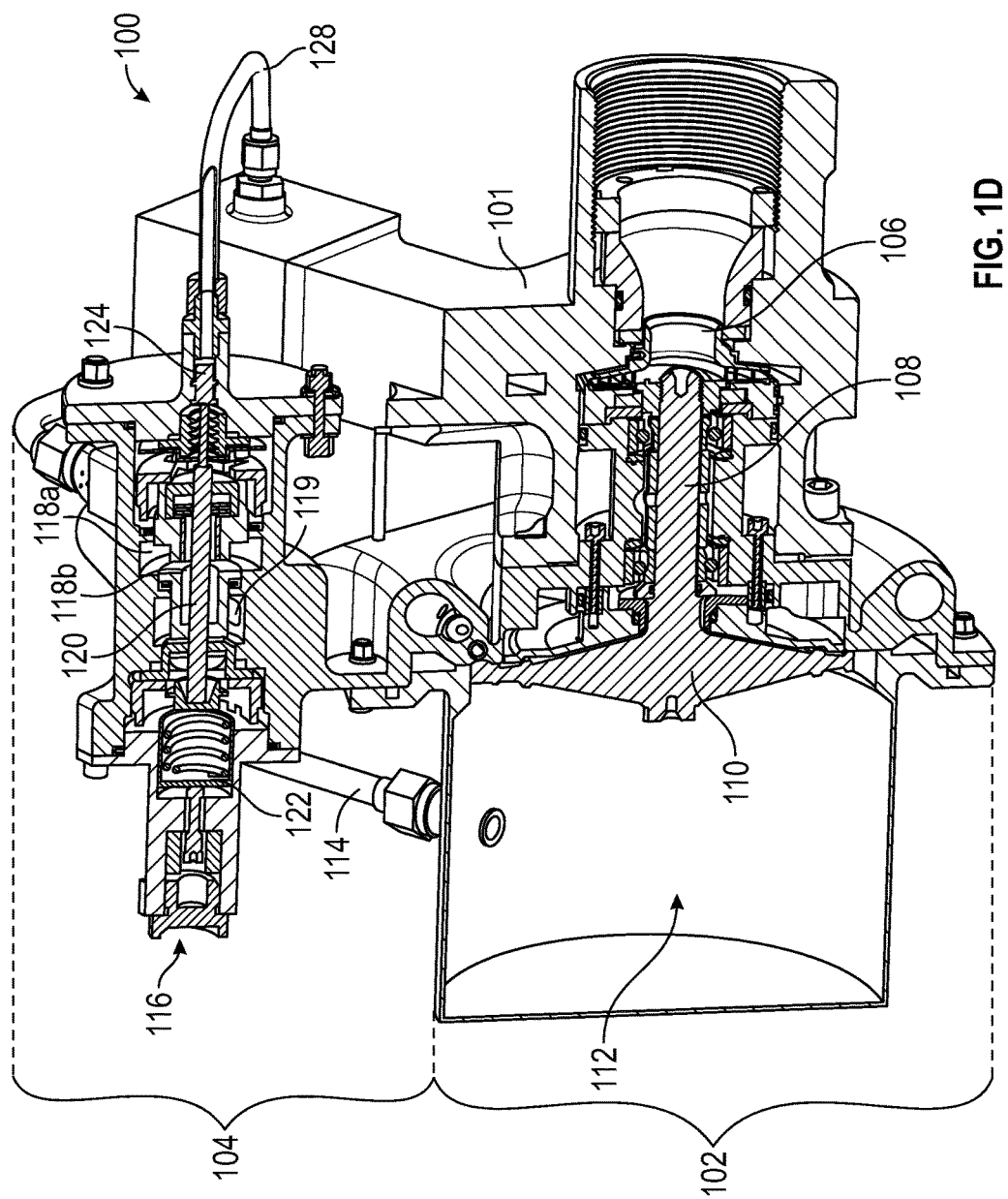
FIG. 1D is a cross-sectional schematic illustration of the turbine pump assembly of FIG. 1C.

FIGS. 1A-1D show various schematic illustrations of a craft 10 and components thereof. FIGS. 1A and 1B show schematic illustrations of a craft 10 that may be configured to employ embodiments provided herein. FIGS. 1C and 1D show schematic illustrations of a turbine pump assembly 100 for a craft, such as craft 10, that may employ embodiments disclosed herein FIG. 1A shows a schematic illustration of the craft 10, which may be a rocket or other space craft. FIG. 1B shows an enlarged schematic illustration of the propulsion system 12 of the craft 10. The craft 10 may include a core booster 14 and may also have additional boosters 16. Each booster 14, 16 includes a body portion 18 extending from a nose portion 20 to a tail portion 22. The tail portion 22 includes the propulsion system 12. The propulsion system 12 includes an engine 24 of the booster. The body portions 18 may contain a liquid or solid propellant to fuel the engine 24 of the respective booster 14, 16. The body portion 18 may also be segmented into multiple booster stages, wherein each stage may contain its own engine. The nose portion 20 may contain, but is not limited to, avionics, payload, and crew compartment, etc. depending on the mission and/or configuration of the craft 10.

As shown, the craft 10 may have a propulsion system 12 that may be configured as one or more rocket engines 24. Each engine 24 may be configured with a nozzle 26 that is configured to direct an output of the respective engine 24. The nozzle 26 thus enables directional control of the thrust of the engine 24 and thus the craft 10. That is, depending on the angle of tilt of the nozzle 26, the craft 10 may be propelled in a specific direction. As such, control of the engine 24 and/or nozzle 26 may be paramount to directional control and safety.

Referring now to FIG. 1B, an enlarged schematic illustration of the propulsion system 12 of the craft 10 according to an embodiment of the present disclosure. The engine 24 may include a combustion chamber and a throat with the nozzle 26 configured thereon to direct exhaust from the throat. Fuel from a respective booster (e.g., boosters 14, 16) is fed into the combustion chamber and ignited. The controlled explosion accelerates as it passes through the throat and out the nozzle 26. This controlled explosion creates the thrust required to propel the craft 10. In order to maneuver the craft 10, the thrust may be directed by a thrust vectoring actuator 28, which physically moves, tilts, translates, rotates, directs and/or adjusts the direction or angle of the engine 24 and/or the nozzle 26 to direct the thrust and thus the direction of movement of the craft 10. As will be appreciated by those of skill in the art, there may be two or more thrust vectoring actuators 28 included on the craft 10, with multiple thrust vectoring actuators 28 configured for each engine and/or nozzle. For example, in some embodiments, two thrust vectoring actuators may be positioned about ninety degrees apart to provide pitch and yaw capability to the craft 10. Accordingly, the thrust vectoring actuators 28 may be provided in operational connection with the engine 24 and/or the nozzle 26. In some configurations, the thrust vectoring actuators may incorporate hydraulic actuators and in other configurations the thrust vectoring actuators may incorporate electromechanical actuators.

Thrust vectoring actuators and related control systems may rely on hydraulic rams to displace the engine nozzle angle, relative to a rocket core axis. The hydraulic rams may require high pressure hydraulic fluid pumping systems capable of providing up to 4000 psia at flow rates of up to 40 gpm. The hydraulic flow and pressure may be generated by a turbine pump assembly. The turbine pump assembly can be powered by hot combustion products, or high pressure cold gas provided by the main engine turbo-pump assembly.

For example, with reference to FIGS. 1C and 1D, schematic illustrations of a turbine pump assembly are shown that may employ embodiments disclosed herein. FIG. 1C is a partial isometric view of a turbine pump assembly 100 and FIG. 1D is a cross-sectional view of the turbine pump assembly 100. The turbine pump assembly 100 is a centrifugal pump based turbine pump assembly having a hydraulic speed control that incorporates a high speed turbine directly coupled to a high speed centrifugal pump. The turbine speed is primarily controlled via a hydraulically driven speed control loop. The turbine speed is modulated by the hydraulic discharge pressure of the centrifugal pump to create a relatively constant hydraulic output pressure that is independent of the discharge flow rate of the hydraulic pump.

Thus, with reference to FIGS. 1C and 1D, the turbine pump assembly 100 includes a turbine/pump section 102 and a control section 104. The turbine/pump section 102 includes a high speed centrifugal pump 106 directly coupled to a turbine shaft 108 of a turbine 110 to generate a desired required hydraulic power within a body 101. A turbine exhaust duct 112 is in fluid communication with the control section 104 by a fluid line 114.

Figure 2A:
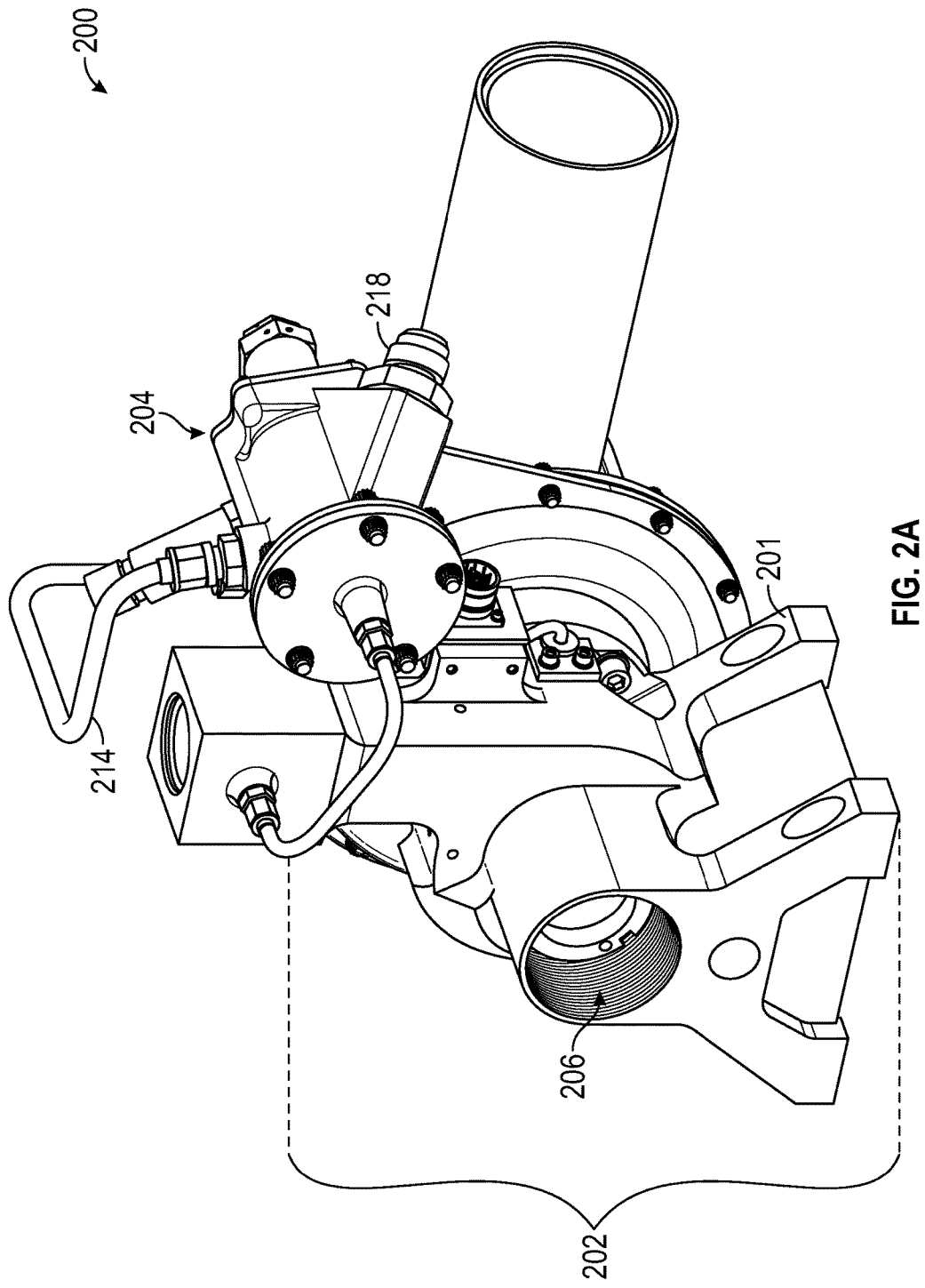
FIG. 2A is schematic illustration of a turbine pump assembly in accordance with an embodiment of the present disclosure.

The control section 104 includes a turbine speed control valve 116. A turbine gas inlet port (e.g., as shown in FIG. 2A) may be connected to a valve discharge port, with flow passing through a turbine nozzle housing, a turbine nozzle, the turbine 110, and then into turbine exhaust duct cavity 112. The turbine gas inlet port may be supplied by the rocket or other engine of the craft (e.g., an engine turbo-pump) and/or hot combustion products which may direct high pressure fluid into a first cavity 118a. The gas passes through the turbine control valve 116 (e.g., decreasing the pressure based on the power need of the turbine 110) and then passes through the turbine nozzles where it is expanded (reducing the pressure to exhaust pressure) thereby increasing the gas velocity.

The turbine speed control valve 116 operates by actuation or movement of a turbine flow rate control spool valve 120 which at one end is in operable communication with a valve opening spring 122 and at another end is in operable communication with a hydraulic piston 124. The hydraulic piston 124 may be a speed control hydraulic piston. Accordingly, the hydraulic piston 124 is in operable communication with a hydraulic pressure tap 126 and a hydraulic pressure feedback line 128.

High pressure fluid may enter the control section at a turbine gas inlet port and enter the first cavity 118a. The fluid in the first cavity 118a may be maintained at a high pressure during all operations of use (when the engine is on). The turbine flow rate control spool valve 120 may be moveable within the control section 104 to control fluid flow from the first cavity 118a to a second cavity 118b. Fluid pressure within the second cavity 118b may be controlled by the position of the turbine flow rate control spool valve 120. Further, fluid within the second cavity 118b may flow through an exit 119 to be directed to a nozzle (not shown).

When the turbine pump assembly 100 is at rest, the valve opening spring 122 forces the turbine flow rate control spool valve 120 open. There is no hydraulic pressure to oppose the valve opening spring 122. In this configuration the valve is fully open, allowing a large propellant mass flow rate to flow through turbine gas inlet port into the second cavity 118b. As the turbine 110 accelerates, the output pressure from the centrifugal pump 106 increases, providing a large valve closing force to oppose the valve opening spring 122.

As the discharge flow rate of the centrifugal pump 106 increases, the hydraulic discharge pressure also increases. As this happens, the hydraulic pressure in a cavity proximal to the hydraulic piston 124 increases, increasing a closing force acting on the valve spool 120. This additional closing force drives the valve spool 120 toward the closed position (against the valve opening spring 122), decreasing a propellant mass flow entering the second cavity 118b (and thus airflow through a nozzle), allowing the turbine 110 to slow down, which decreases the operating speed of the centrifugal pump 106, thereby reducing the discharge pressure of the centrifugal pump 106.

As the discharge flow rate of the centrifugal pump 106 continues to increase, a discharge pressure of the centrifugal pump may begin to decline. As this happens, the hydraulic pressure in the cavity of the hydraulic piston 124 may begin to fall, causing a reduction in the force applied by the hydraulic piston 124. As this happens, the valve opening spring 122 may push the valve spool 120 toward the open position, allowing more mass flow to enter the second cavity 118b and be directed through a nozzle, allowing the speed of the turbine 110 to rise, which may drive the discharge pressure of the centrifugal pump 106 back to a desired value.

The above described and shown turbine pump assembly may be relatively simple and relatively low cost in terms of parts, construction, complexity, etc., there may be efficiency improvement that may be made. For example, when the centrifugal impeller shrouds of the centrifugal pump are rotated at very high speed, while being completely flooded with hydraulic oil, there may be some losses of efficiency. That is, for example, in one non-limiting embodiment, the centrifugal pump 106 may operate at 70,000 rpm, which may result in friction losses associated with first and second shrouds (e.g., a power consumption of 80 horsepower). Without friction losses, a hydraulic reservoir size could be reduced by a factor of two or more.

Accordingly, in accordance with embodiments provided herein, systems and methods of reducing frictional losses in centrifugal pump operation are disclosed. In accordance with one or more embodiments provided herein, a turbine pump assembly is configured to employ a vacuum and close tolerance labyrinth seals to purge hydraulic oil from first and second shrouds of a high speed centrifugal impeller to reduce frictional losses of the centrifugal pump impeller.

Figure 2B:
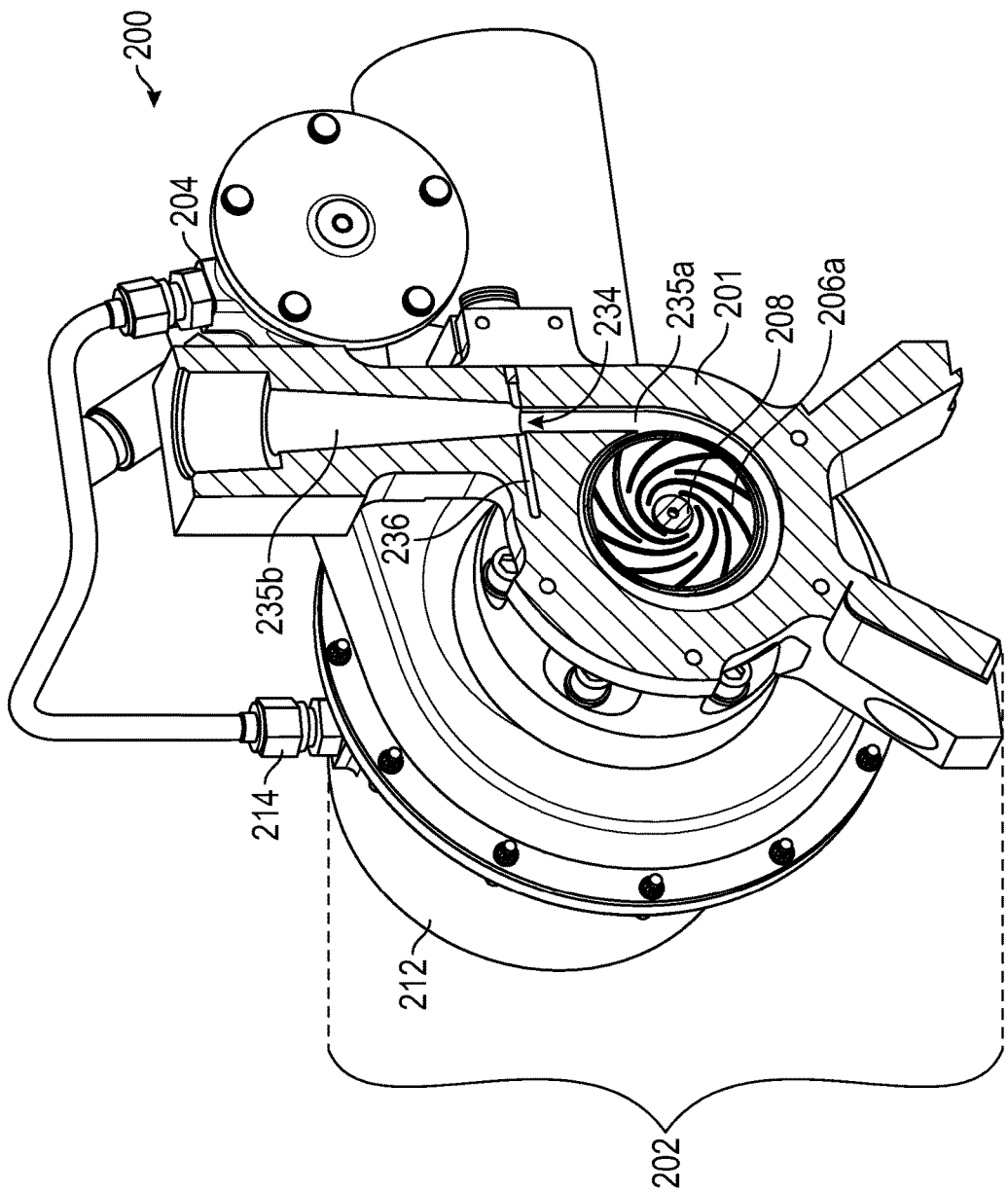
FIG. 2B is a cross-sectional schematic illustration of the turbine pump assembly of FIG. 2A.
Figure 2C:
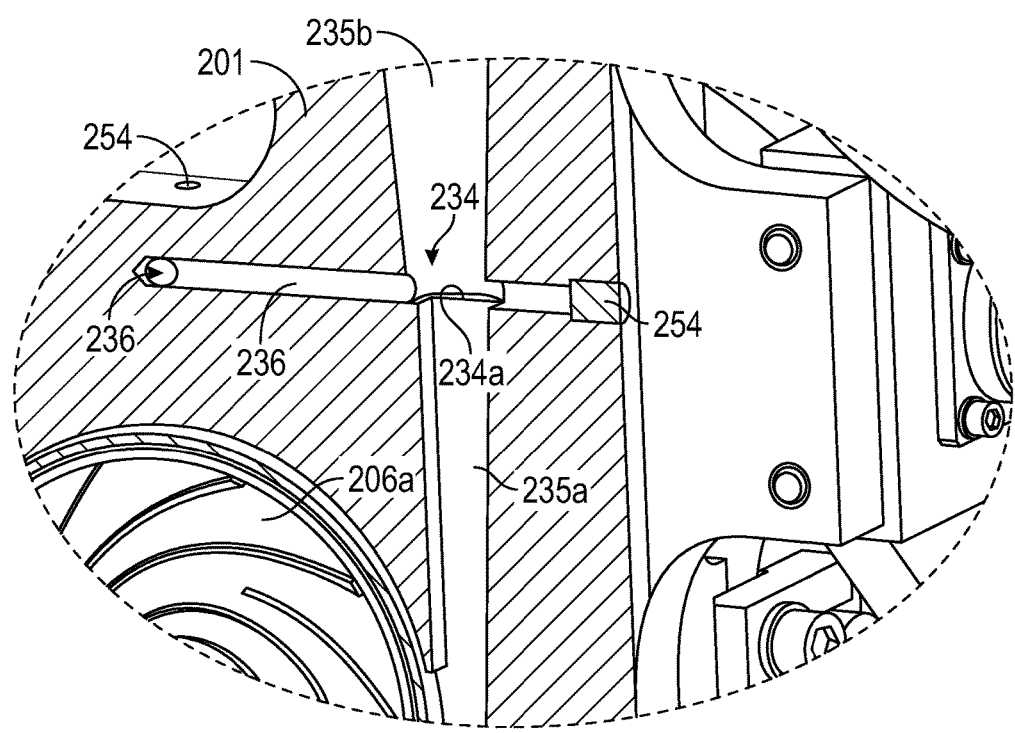
FIG. 2C is an enlarged schematic illustration of a portion of the turbine pump assembly of FIG. 2A.
Figure 2D:
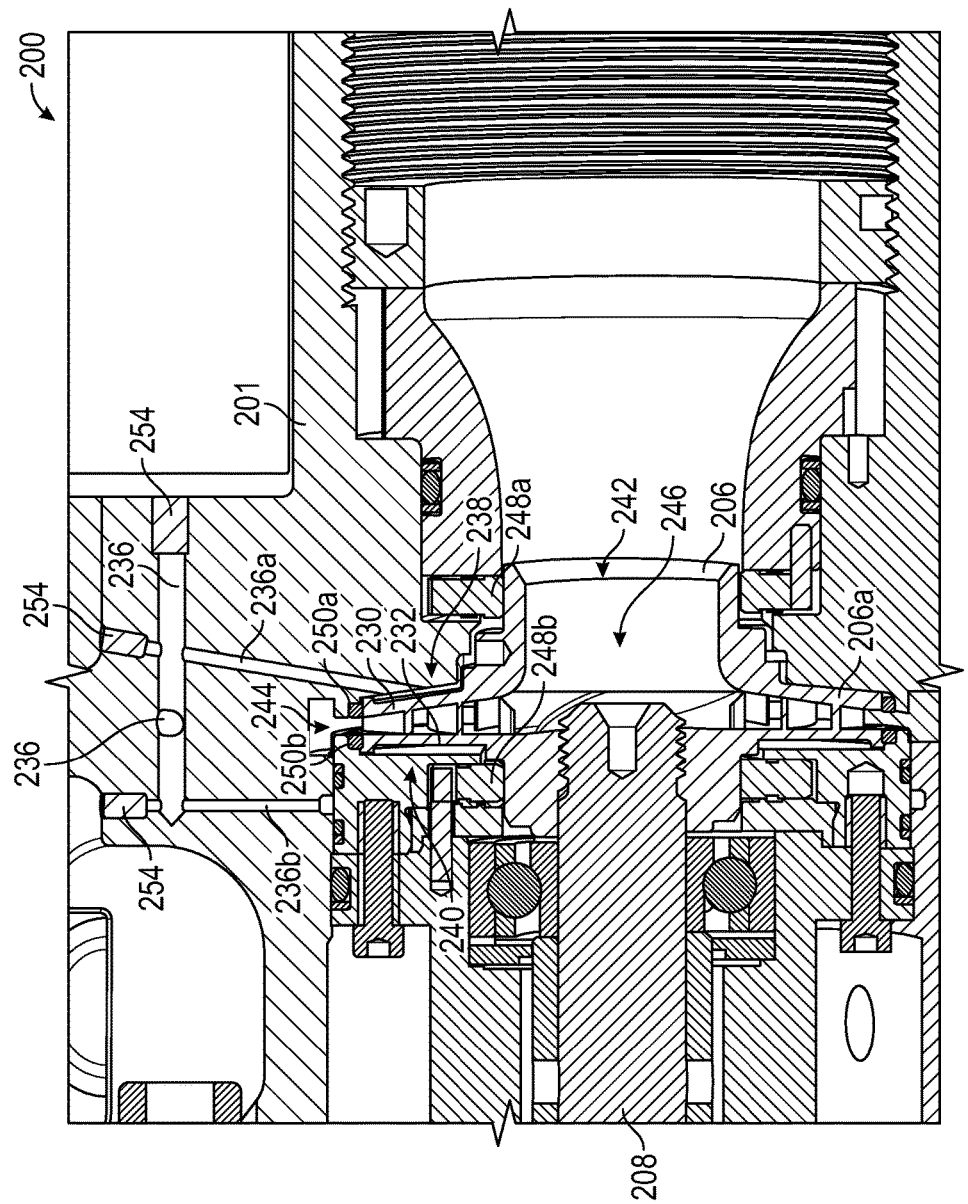
FIG. 2D is another cross-sectional schematic illustration of the turbine pump assembly of FIG. 2A.

Turning now to FIGS. 2A-2D, schematic views of a turbine pump assembly 200 in accordance with a non-limiting embodiment of the present disclosure are shown. FIG. 2A shows an isometric schematic view of a turbine pump assembly 200 in accordance with an embodiment of the present disclosure. FIG. 2B shows a partial cut-away view of the body 201 of the turbine/pump section 202. FIG. 2C shows an enlarged view of an ejector pump formed in the housing 201 of the turbine pump assembly 200. FIG. 2D shows a cross-sectional schematic view of the turbine pump assembly 200 showing a vacuum flow path within the turbine pump assembly 200. The turbine pump assembly 200 is substantially similar to the turbine pump assembly 100 of FIGS. 1A and 1B, and thus similar features may not be described again.

As shown, the turbine pump assembly 200 includes a control section 204 operably connected to a turbine/pump section 202. The turbine/pump section 202 includes a centrifugal pump 206 having an impeller 206a with a first shroud 230 and a second shroud 232, with respective shroud cavities defined thereabout (see, e.g., FIG. 2D), within a body 201. The centrifugal pump 206 is operably connected to a turbine shaft 208 of a turbine (not shown). A fluid line 214 connects a turbine exhaust duct 212 of the turbine/pump section 202 to the control section 204. FIG. 2A also shows the turbine gas inlet port 218. In some non-limiting embodiments, the first shroud 230 may be a front shroud and the second shroud 232 may be a rear shroud, e.g., based on a fluid flow direction through the centrifugal pump 206.

As shown in FIGS. 2B-2D, an ejector pump 234 is formed within a diffuser flow path 235a, 235b (the flow path formed from a diffuser throat 235a and a diffuser cone 235b). Specifically, the ejector pump 234 may be configured between the diffuser throat 235a and the diffuser cone 235b, although other locations within the diffuser flow path are envisioned. In accordance with a non-limiting example, as high velocity oil exits the diffuser throat 235a, it enters the diffuser cone 235b. At the interface from the diffuser throat 235a to the diffuser cone 235b, a step (ejector pump 234) is machined into the body 201. The step (ejector pump 234) creates a fluid zone with a very low static pressure. The low static pressure zone is connected via a set of purge flow paths 236 to the shroud cavities 238, 240.

The ejector pump 234 is configured to reduce pressures within shroud cavities 238, 240 (see, FIG. 2D) to form a vacuum or near vacuum and vaporize hydraulic oil within the shroud cavities 238, 240. The ejector pump 234, in combination with seals 248a, 248b, 250a, 250b (see FIG. 2D; e.g., close tolerance labyrinth seals) may purge the hydraulic oil from the shroud cavities 238, 240 of the high speed centrifugal pump 206 to significantly reduce the frictional losses of the centrifugal pump 206. In some configurations, the vaporized hydraulic oil may form a gas or air bearing and/or lubricant within the shroud cavities 238, 240.

As noted, a vacuum or near vacuum may be generated in the shroud cavities 238, 240. In such a configuration, the seals 248a, 248b, 250a, 250b may be lubricated by hydraulic oil flowing across them, however, as the oil passes through the respective seals 248a, 248b, 250a, 250b, the static pressure will fall (until it leaves the seal entirely, at which point the static pressure will be at the shroud cavity pressure, e.g., a vacuum or near vacuum). Due to the vacuum or near vacuum, the shroud cavity pressure will be below the vaporization pressure for the hydraulic oil, causing the oil to flash off into a vapor. The resulting vapor will have a significantly lower density and viscosity, both of which will reduce the viscous losses on the impeller wheel faces.

Turning now to FIG. 2C, an enlarged illustrative view of the ejector pump 234 is shown. The ejector pump 234 is formed and enabled by an ejector pump face 234a. The ejector pump face 234a is formed as a backward facing step ejector pump. That is, the ejector pump face 234a is an angled face that is angled relative to a flow direction of fluid through the diffuser flow path 234a, 235b (e.g., upward in FIG. 2C). As shown, the ejector pump 234 is built into the centrifugal pump diffuser housing 201. The ejector pump 234 utilizes the discharge flow of the centrifugal pump 206 as motive flow to create a vacuum (at the ejector pump face 234a), which in turn reduces the fluid density of the hydraulic fluid in the centrifugal pump shroud cavities 238, 240. That is, the ejector pump face 234a (and the generated vacuum) is in fluid communication with a purge flow path 236. The purge flow path 236 may extend into the body 201 (e.g., compare FIGS. 2C and 2D).

Turning now to FIG. 2D, an alternative cross-sectional schematic illustration of turbine pump assembly 200 having a vacuum aided purge system is shown. FIG. 2D (and FIG. 2C) shows a detailed view of the construction of purge paths within a body 201 of the turbine pump assembly 200 to enable evacuation of hydraulic oil from the shroud cavities 238, 240, and vaporization thereof, thereby providing a gaseous lubricant that replaces an oil lubricant in the shroud cavities 238, 240.

As shown, the centrifugal pump 206, located within the body 201, includes an impeller 206a having a first shroud 230 and a second shroud 232. A first shroud cavity 238 is defined between a surface of the first shroud 230 and a surface of the body 201 and a second shroud cavity 240 is defined between a surface of the second shroud 232 and another surface of the turbine pump assembly 200 (e.g., a surface of the body 201 or other component of the turbine pump assembly 200). In a traditional configuration, the first shroud cavity 238 and the second shroud cavity 240 may be filled with hydraulic oil due to fluid connection with an impeller discharge. Fluid may enter the interior of the centrifugal pump 206 at a pump impeller inlet 242 and exit at a pump impeller outlet 244, flowing through an internal fluid cavity 246, and into the diffuser flow path 235a, 235b.

As shown in FIG. 2D, the shroud cavities 238, 240 may be sealed relative to the internal fluid cavity 246 by means of the inner diameter seals 248a, 248b and the outer diameter seals 250a, 250b. First inner diameter seal 248a and first outer diameter seal 250a may be configured to seal the first shroud cavity 238 and second inner diameter seal 248b and second outer diameter seal 250b may be configured to seal the second shroud cavity 240.

In operation, fluid flow through the diffuser flow path 235a, 235b will generate a vacuum at the ejector pump face 234a. The vacuum will generate a low pressure such that fluid will be pulled through the purge gas flow paths 236 formed within the body 201. For example, as shown, fluid may be pulled into a main flow path 236 from separate first gas flow path 236a that is configured in fluid communication with the first shroud cavity 238 and second gas flow path 236b that is configured in fluid communication with the second shroud cavity 240. The low pressure suction (e.g., vacuum) may then expunge any oil within the shroud cavities 238, 240 past the seals 248a, 248b, 250a, and 250b. The low pressure may enable any liquid within the shroud cavities 238, 240 to vaporize. Thus, the shroud cavities 238, 240 may be filled with gas and any liquid therein may be removed. In some non-limiting embodiments, one or more of the seals 248a, 248b, 250a, and 250b may be labyrinth seals.

FIGS. 2C and 2D also illustrate a manufacturing assembly and formation of the turbine pump assembly 200 in accordance with embodiments described herein. As shown, the flow paths (main flow path 236, first flow path 236a, and second flow path 236b) may be drilled or machined after formation of the body 201. Such manufacturing may require plugs 254 configured to plug and seal each of the drilled or machined flow paths. Accordingly, the flow paths as described herein may be formed after formation of the body 201. However, those of skill in the art will appreciate that other manufacturing techniques may be employed without departing from the scope of the present disclosure. For example, molds, casting, and/or additive manufacturing may be used to form a body having the flow paths as described herein.

Figure 3:
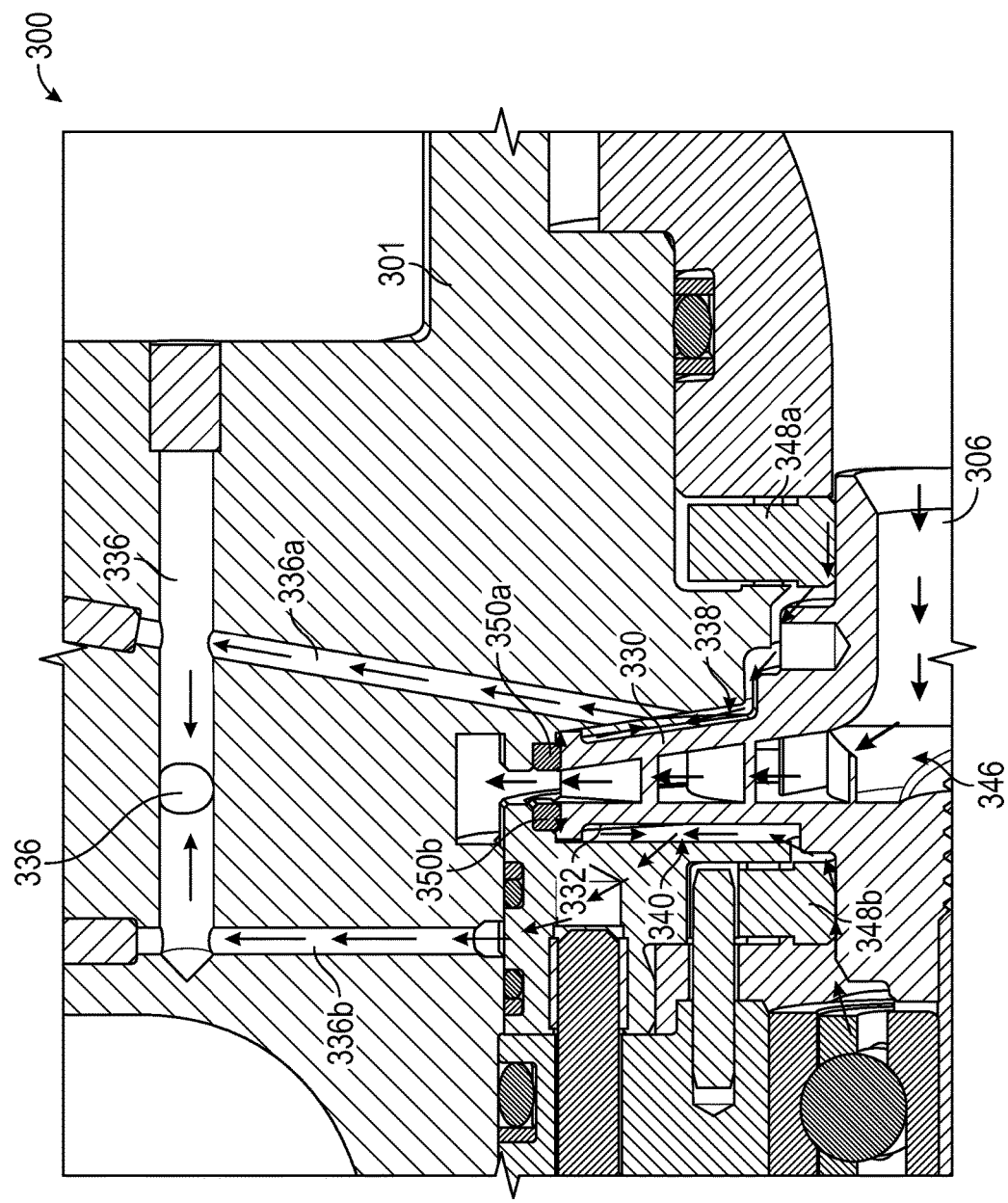
FIG. 3 is a schematic illustration showing fluid flow within the flow paths of the turbine pump assembly in accordance with an embodiment of the present disclosure.

Turning now to FIG. 3, a directional flow path within a turbine pump assembly 300 is shown. The turbine pump assembly 300 may be substantially similar to the turbine pump assemblies shown and described above, having an ejector pump formed within a diffuser flow path (not shown). The arrows indicate flow direction of fluid through the turbine pump assembly 300 when in use.

Fluids may be pulled into the main purge flow path 336 when the vacuum or low pressure is generated by the ejector pump within the diffuser flow path. The fluid is sourced from the shroud cavities 338, 340. That is, the low pressure (or vacuum) sucks fluid from the shroud cavities 338, 340 thus extracting liquid and reducing the pressure within the shroud cavities 338, 340. The reduced pressure may enable liquid remaining within the shroud cavities 338, 340 to vaporize, thus forming a gaseous lubricant that replaces a liquid lubricant within the shroud cavities 338, 340. The fluid may flow through the first purge gas flow path 336*a* (and from the first shroud cavity 338) into the main purge flow path 336, as shown by the arrows. Additionally, fluid may flow through the second purge gas flow path 336*b* into the main purge gas flow path 336, as indicated by the arrows. From there, the fluid will flow through the main purge gas flow path 336 and enter and mix with fluid flow within the diffuser flow path.

As noted, a small amount of the liquid may remain within the shroud cavities 338, 340 and be vaporized due to the low pressure generated by the ejector pump. The liquid passing through and by the seals of the shroud cavities 338, 340 may act as a lubricant for the seals 348*a*, 348*b*, 350*a*, and 350*b*.

As indicated by the arrows, a small amount of fluid flow may leak past (or be pulled through) the seals 348*a*, 348*b*, 350*a*, and 350*b*. This fluid may be vented through the purge flow paths 336, 336*a*, 336*b* and enter the diffuser flow path. The leakage of the hydraulic oil past the seals 348*a*, 348*b*, 350*a*, and 350*b* prevents a complete vacuum to form within the shroud cavities 338, 340, and enables a small amount of oil (whether liquid or gaseous) to be present within the shroud cavities 338, 340.

Figure 4:
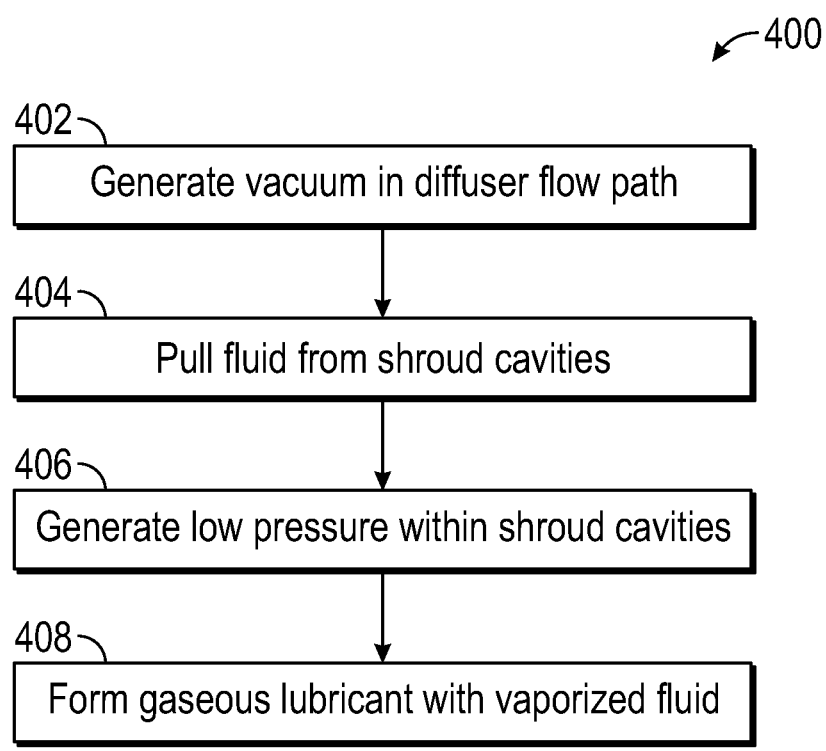
FIG. 4 is a flow process for operating a turbine pump assembly in accordance with an embodiment of the present disclosure.

Turning now to FIG. 4, a flow process 400 for operating a turbine pump assembly in accordance with a non-limiting embodiment of the present disclosure is shown. The flow process 400 may be performed by and with a turbine pump assembly as shown and described above.

At block 402 a fluid may be passed through a diffuser flow path of the turbine pump assembly to thus generate a vacuum or low pressure at an ejector pump. The vacuum or low pressure may pull fluid from fluidly connected shroud cavities, through one or more purge gas flow paths that fluidly connect the ejector pump with the shroud cavities, as shown at block 404. The shroud cavities may be located external to a centrifugal pump, and particularly may be formed about a shroud of the centrifugal pump.

As shown at block 406, the low pressure that is generated within the purge gas flow paths may pull any liquid from the shroud cavities. Some liquid or gas may be pulled through or past one or more seals that seal the shroud cavity.

As shown at block 408, the low pressure generated within the shroud cavity may be sufficient to vaporize liquid within the shroud cavity. Thus, any remaining liquid within the shroud cavity may form a gaseous lubricant or gas bearing for the shroud within the shroud cavity. That is, the gas may replace a liquid lubricant and prevent liquid from entering the shroud cavity (e.g., by the seals and/or vaporization). Accordingly, viscous losses may be prevented by replacing the liquid lubricant with a gaseous lubricant.

Advantageously, embodiments described herein provide a turbine pump assembly that incorporates a high speed turbine, directly coupled to a high speed centrifugal pump. Such configuration may provide improved efficiencies, reduced costs, and other benefits. In some embodiments, the turbine may spin at approximately 70,000 rpm, and with an oil-based lubricant, the impeller shroud disk friction may consume nearly 80 horsepower. However, advantageously, embodiments provided herein may reduce the impeller disk friction from 80 horsepower to nearly zero by using an ejector pump to displace the hydraulic oil in the pump shroud cavities. The pump shroud cavities may be sealed at the impeller ID and OD by seals, maintaining gas within the cavities and preventing oil from entering the shroud cavities.

Moreover, advantageously, embodiments provided herein may enable increased efficiency of a turbine pump assembly. For example, viscous drag on the impeller front and second shrouds may be reduced. The increase in efficiency may decrease propellant requirements of the turbine pump assembly. Furthermore, a required system reservoir volume needed to absorb waste heat energy of the hydraulic system may be decreased.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although shown with flow paths configured to enable removal or suction to both the front and second shroud cavities from the ejector pump, those of skill in the art will appreciate that only one of the two shrouds may be configured to have a low pressure or vacuum formed therein without departing from the scope of the present disclosure. Further, although shown with the ejector pump formed at a transition between a diffuser throat and a diffuser cone, those of skill in the art will appreciate that the ejector pump may be formed at various locations, e.g., within the diffuser flow path. Further, in some embodiments, alternative forms for generating a vacuum or low pressure within the shroud cavities may be employed. For example, in one non-limiting example, a different type of pump may be used to operate similarly to that described above.

Accordingly, the present disclosure is not to be seen as limited by the foregoing description, but is only limited by the scope of the appended claims.

What is claimed is:

1. A turbine pump assembly comprising:
a body;
a centrifugal pump having a shroud located within the body;
a shroud cavity formed external to the shroud;
an ejector pump fluidly connected to the shroud cavity by a purge gas flow path, the ejector pump configured to reduce a pressure within the shroud cavity; and an inner diameter seal and an outer diameter seal, the seals configured to seal the shroud cavity with respect to a liquid fluid path within the turbine pump assembly, wherein at least one of the inner diameter seal and the outer diameter seal is configured to enable fluid to escape through the respective seal into the shroud cavity.

2. The turbine pump assembly of claim 1, wherein the ejector pump is formed within a diffuser flow path of the turbine pump assembly.

3. The turbine pump assembly of claim 2, wherein the ejector pump comprises an ejector pump face formed in a surface of the body defining the diffuser flow path.

4. The turbine pump assembly of claim 2, wherein the diffuser flow path comprises a diffuser throat and a diffuser cone, wherein the ejector pump is formed at transition from the diffuser throat to the diffuser cone.

5. The turbine pump assembly of claim 1, wherein the shroud is a first shroud and the shroud cavity is a first shroud cavity, the centrifugal pump having a second shroud and a respective second shroud cavity formed external to the second shroud.

6. The turbine pump assembly of claim 5, wherein the ejector pump is fluidly connected to the first shroud cavity and the second shroud cavity to reduce a pressure in each of the first shroud cavity and the second shroud cavity.

7. The turbine pump assembly of claim 1, further comprising a plug configured to plug a portion of the purge gas flow path.

8. A method of manufacturing a turbine pump assembly comprising:
    forming a body;
    forming an ejector pump to purge gas through a purge gas flow path within the body to reduce a pressure within a shroud cavity that is external to a centrifugal pump;
    installing the centrifugal pump into the body, the centrifugal pump having a shroud, wherein the shroud defines a portion of the shroud cavity; and
    installing an inner diameter seal and an outer diameter seal about the shroud, the seals configured to seal the shroud cavity with respect to a liquid fluid path within the turbine pump assembly,
    wherein at least one of the inner diameter seal and the outer diameter seal is configured to enable fluid to escape through the respective seal into the shroud cavity.

9. The method of claim 8, further comprising generating a low pressure at the ejector pump to pull fluid through the purge flow path into a diffuser flow path to expel liquid out of the shroud cavity.

10. The method of claim 8, further comprising plugging a portion of the purge gas flow path with a plug.

11. A method of operating a turbine pump assembly, the turbine pump assembly having a body, a centrifugal pump having a shroud located within the body, an ejector pump fluidly connected to a shroud cavity by a purge gas flow path, the ejector pump configured to reduce a pressure within the shroud cavity; and an inner diameter seal and an outer diameter seal, the seals configured to seal the shroud cavity with respect to a liquid fluid path within the turbine pump assembly, wherein at least one of the inner diameter seal and the outer diameter seal is configured to enable fluid to escape through the respective seal into the shroud cavity, the method comprising: generating a low pressure at the ejector pump; pulling fluid through the purge gas flow path from the shroud cavity; and forming a gaseous lubricant within the shroud cavity by vaporizing a portion of the fluid within the shroud cavity.

12. The method of claim 11, wherein the fluid pulled through the purge gas flow path is supplied into a diffuser fluid path.

13. The method of claim 12, wherein the ejector pump is formed within the diffuser fluid path.

* * * * *